United States Patent [19]

Kline

[11] 4,253,955
[45] Mar. 3, 1981

[54] LIQUID-SOLIDS SEPARATOR

[75] Inventor: Richard L. Kline, Louisville, Ky.

[73] Assignee: American Air Filter Company, Inc., Louisville, Ky.

[21] Appl. No.: 60,643

[22] Filed: Jul. 25, 1979

[51] Int. Cl.³ .............................................. B01D 29/04
[52] U.S. Cl. ...................... 210/172; 55/228; 210/256; 210/261; 210/414; 422/160; 210/433.1
[58] Field of Search ................ 55/228, 430; 210/167, 210/256, 261, 413, 414, 433 R, 172; 422/160

[56] References Cited

U.S. PATENT DOCUMENTS

| | | | |
|---|---|---|---|
| 2,142,406 | 1/1939 | Nonhebel et al. | 55/228 X |
| 2,606,663 | 8/1952 | Backman et al. | 210/433 R X |
| 2,716,489 | 8/1955 | Way | 210/413X |
| 2,788,954 | 4/1957 | Paasche | 210/167 X |
| 3,341,016 | 9/1967 | Paasche | 210/167 X |
| 3,741,892 | 6/1973 | Bourdale | 210/433 R X |
| 3,794,179 | 2/1974 | Doucet | 210/433 R X |
| 3,989,465 | 11/1976 | Onnen | 422/160 X |

FOREIGN PATENT DOCUMENTS 735581 5/1943 Fed. Rep. of Germany ...... 210/433 R

Primary Examiner—Robert H. Spitzer
Attorney, Agent, or Firm—Thomas G. Anderson

[57] ABSTRACT

A continuous flow liquids-solids separator for removing particulate solids suspended in gas scrubbing liquids used in industrial stack gas scrubbing systems. The separator includes a solids separating tank having a pair of parallel perforated walls and an inlet aligned to direct an entrant flow of the liquid-solids suspension in a direction generally parallel with the perforated walls to promote separation of the suspension such that particulate solids are retained in the tank while the scrubbing liquids flow into a liquids reservoir. The tank is supported within the reservoir and is connected with a bleed discharge line which accomodates continuous evacuation of the retained solids from the tank concurrent with the discharge of scrubbing liquids through an outlet in the liquids reservoir.

13 Claims, 6 Drawing Figures

LIQUID-SOLIDS SEPARATOR

BACKGROUND OF THE INVENTION

1. Field of the Invention

This invention relates to a liquids-solids separator and in particular to a separator in a gas scrubbing system for removing sulfur oxides and particulate material from industrial stack gases.

2. Description of the Prior Art

As exemplified by U.S. Pat. No. 3,989,465 which shows a wet gas scrubbing apparatus for removing sulfur oxides from hot industrial stack gases, the typical wet scrubbing system provides that stack gases be directed through a scrubbing tower wherein a scrubbing spray of liquid reactant is continuously injected into the gas flow by a series of nozzles within the tower. During the scrubbing process, the reactant liquid neutralizes and entrains the sulfur oxides in the gases as well as flyash and other particulate solids to form a liquids-solids suspension which is in turn collected and directed to flow through a reaction tank connected to or integral with the scrubbing tower. As the suspension flows through the reaction tank, particulate solids, including scale resulting as a precipitate of the scrubbing process, settle out of the suspension for subsequent removal from the tank as a slurry or sludge, and concurrently, additional reactant materials are added to regenerate the reactant liquid. Thereafter, as the regenerated reactant flows from the tank, it is pumped back to the scrubbing tower and again injected into the gas flow to maintain the scrubbing process.

In scrubber arrangements such as the foregoing, it is particularly desirable to maintain turbulence in the reactant liquid while it is in the reaction tank. This promotes homogeneity of the liquid to insure its complete regeneration while accommodating close control of the regenerated liquid's pH as it leaves the tank to reduce the possibility of acid attack in the scrubber as well as the formation of excessive scale or precipitates in the scrubbing tower. However, this reduces the settling rate and thus limits removal of particulate solids from the suspension in the tank such that it has been necessary to provide a screen or similar filtering arrangement across the return line provided to convey the regenerated reactant liquid back to the scrubbing tower to prevent clogging of the nozzles in the tower. Thus, while this type of arrangement accommodates removal of the solids retained in the regenerated reactant liquids, experience has shown that it must be very closely monitored by operating personnel and frequently cleaned or replaced during normal operation of the scrubbing system.

SUMMARY OF THE INVENTION

This invention relates to a liquids-solids separator and in particular to a separator for removing particulate solids from gas scrubbing or reactant liquids used in industrial stack gas scrubbing systems.

In the present arrangement, a continuously flowing suspension of reactant liquids and entrained solids is fed into a separating tank provided in the separator. The tank includes at least one perforated wall which effects a solids barrier accommodating the flow of separated liquids through the wall into a liquids reservoir for subsequent use in the scrubbing system. Concurrently, separated solids such as scale precipitates and flyash are collected and continuously evacuated from a hopper provided at the base of the tank. The inlet structure provided for the separating tank is generally aligned with the perforate wall such that the suspension is injected into the tank in a direction substantially parallel with the perforate wall. By this arrangement, the invention promotes inertial solids separation as well as filtration and sedimentation while at the same time maintaining a wall-cleaning fluid circulation within the separating tank. Additionally, in the event that the separating tank becomes clogged due to sudden or unforeseen increases in the scaling rate or the like during scrubbing operations, an auxiliary cleaning arrangement is also provided for removing any obstructions without interrupting operation of the scrubbing system.

While the separator embodying the invention is particularly suited for gas scrubbing systems where continuous and reliable operation is essential, it is to be understood that various changes can be made in the arrangement, form, and scope of the present disclosure without departing from the nature and spirit of the invention.

DESCRIPTION OF THE PREFERRED EMBODIMENT

Figure 1:
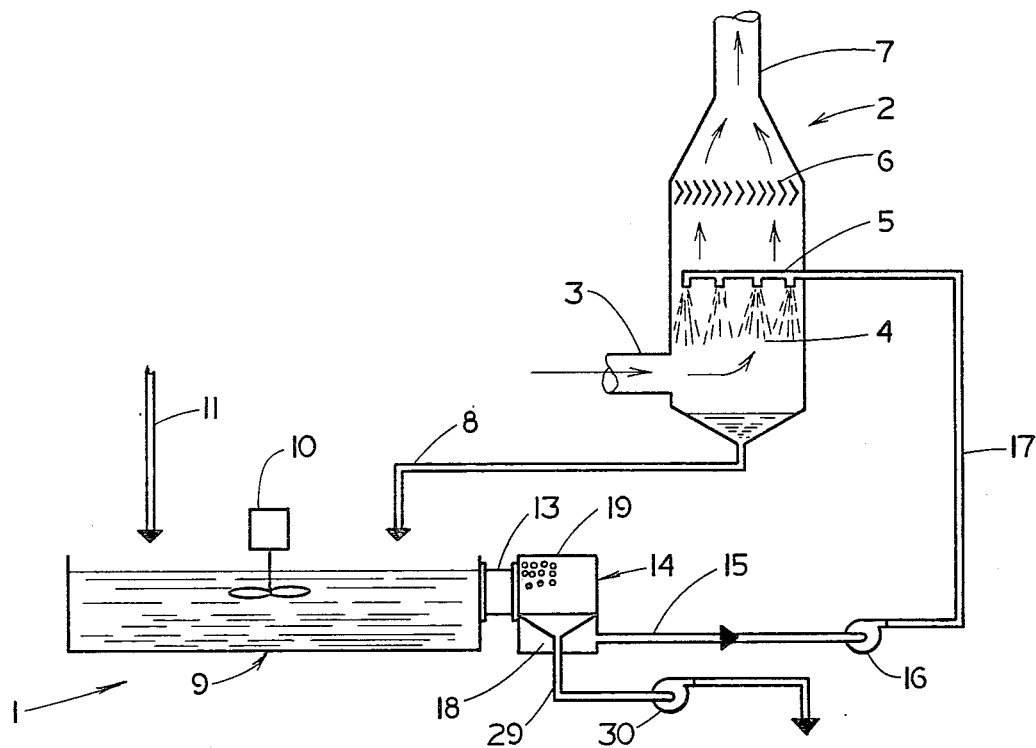
FIG. 1 is a schematic diagram showing a gas scrubbing system embodying the separator arrangement of the invention.

As shown in FIG. 1, the gas scrubbing system 1 includes a scrubbing tower 2 having a gas inlet 3 through which hot industrial stack gases are directed into the tower. The hot gases flow upwardly in the tower through a reactant contact zone 4, past a reactant liquid injection nozzle arrangement 5, through liquid eliminators or demisters 6, and out of the tower through the stack 7. As is well known in the art, when the gases pass through the contact zone 4 they react with a sulfur oxides reactant material contained in liquid reactant sprayed or injected into the flowing gases by the nozzle arrangement 5. Thus, a reaction product including scale precipitates is formed which is entrained in the liquid reactant along with flyash and other particulate matter separated from the flowing gases. The resulting suspension is collected at the bottom of the tower where it is carried by line 8 to a filled continuously flowing reaction tank or basin 9 for regeneration of the liquid reactant whereafter the reactant is recycled back to the scrubbing tower and again injected into the contact zone to scrub the stack gases.

The reaction tank 9 preferably includes a fluid agitator or stirring device 10 which promotes turbulence in the suspension while it is in the tank. Experience has shown that this is particularly desirable since it enhances homogeneity of the liquids within the reaction tank 9 and thereby accommodates accurate measurement and adjustment of the alkalinity of the reactant liquid by selective injection of additives or fresh reactant materials into the tank from a reactant holding tank through line 11. Typically, as the suspension flows through the tank 9, sensors (not shown) measure the pH of the reactant liquid in the suspension, and, as disclosed in U.S. Pat. No. 3,989,465 the sensors regulate the flow of fresh sulfur dioxide reactants such as aqueous calcium hydroxide or the like into the reaction tank to assure complete regeneration of the reactant liquid as it flows through the tank.

The suspension flows out of the reaction tank through outlets 12 and into inlet spillways 13 which feed into a liquids-solids separator 14 wherein the substantially solid reactant products or scale precipitates as well as flyash and other particulate matter are separated from the regenerated reactant liquid. The reactant liquid is in turn drawn from the separator through outlets 15, each outlet 15 being connected with a pump 16 to direct the liquid back to the scrubbing tower through line 17 connected with the reactant nozzle arrangement 5 which again injects the reactant into the contact zone 4 as noted above.

The liquids-solids separator 14 is of a welded construction and includes a liquids reservoir 18 and a pair of transversely spaced solids separating tanks 19 extending between and supported by the reservoir sidewalls 20 and 21. The separating tanks 19 are preferably of a generally rectangular horizontal cross-sectional configuration wherein the opposing reservoir side walls 20 and 21 enclose the ends of each tank 19 and spaced perforate walls or plates 22 and 23 form the respective sides of the tanks. The perforate plates are carried by the side walls 20 and 21 and provide fluid communication between the interior of each tank 19 and the liquids reservoir while effecting a particulate solids barrier as will be described. The bottom of each tank 19 is enclosed by a solids collection hopper 24 including downwardly converging slope sheets 25 and 26 extending from the sidewalls 20 and 21 and vertical side plates 27 and 28 depending from associated perforate plates 22 and 23, respectively. Each hopper in turn discharges into a bleed line 29 which is connected with a pump 30 or similar flow regulating arrangement to continuously draw off and dispose of the solids settling into the hopper as a slurry or sludge during scrubbing operations.

Figure 2:
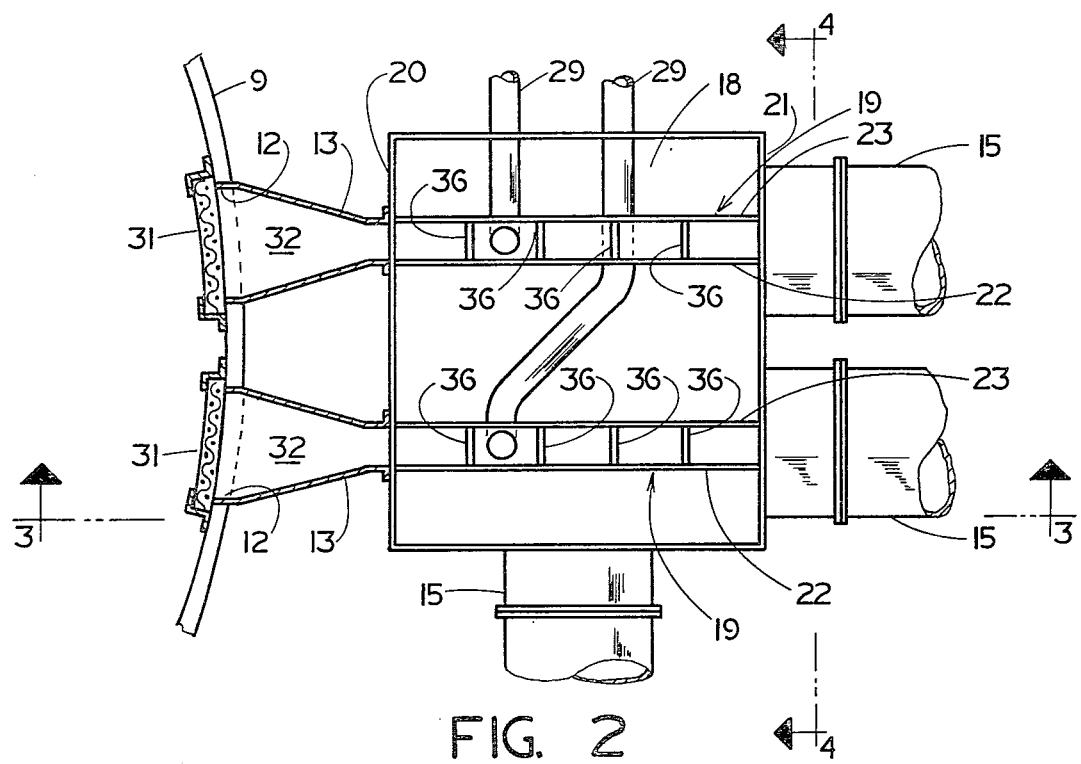
FIG. 2 is a plan view of the separator arrangement.
Figure 3:
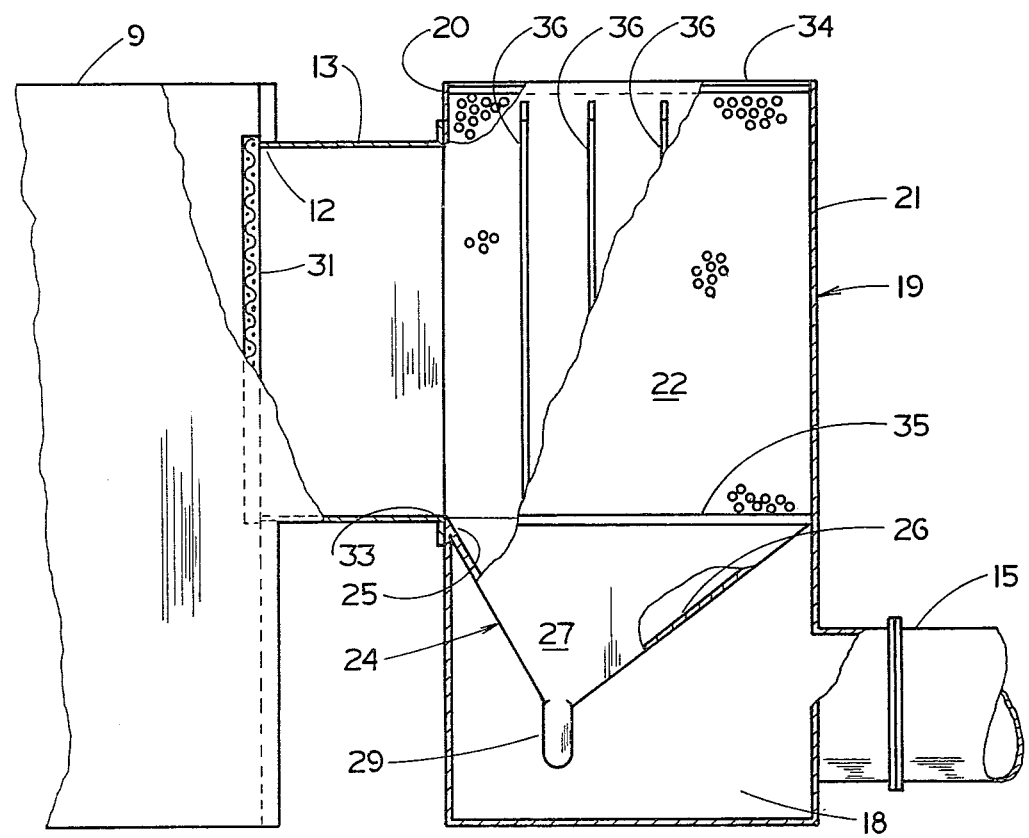
FIG. 3 is a cross-sectional view, partially in section, taken generally along line 3—3 in FIG. 2.
Figure 4:
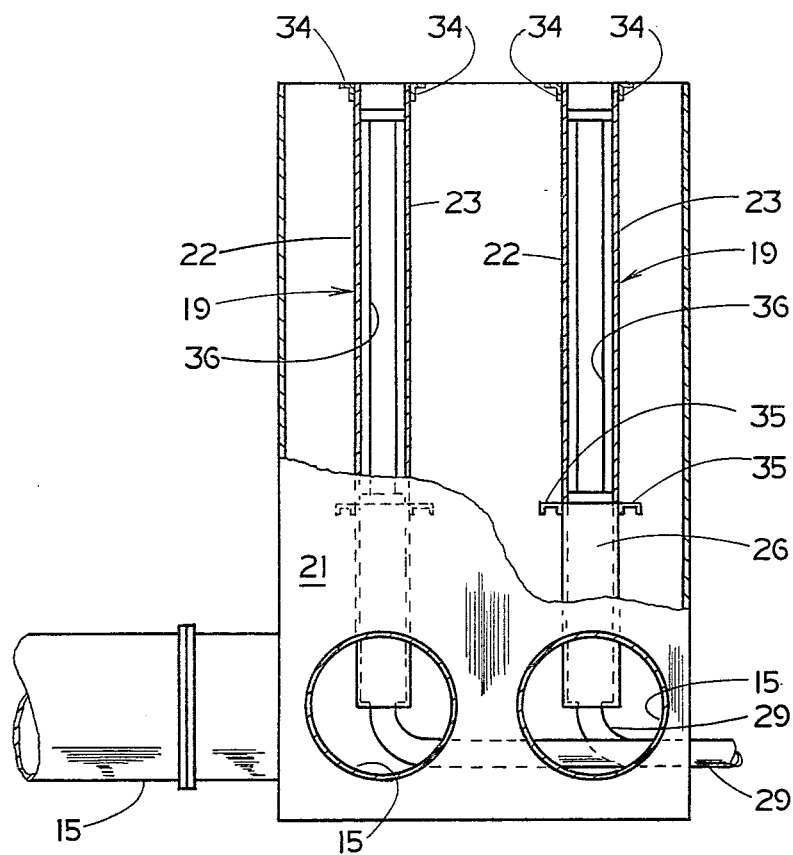
FIG. 4 is an end elevational view, partially in section, taken generally along line 4—4 in FIG. 2.
Figure 5:
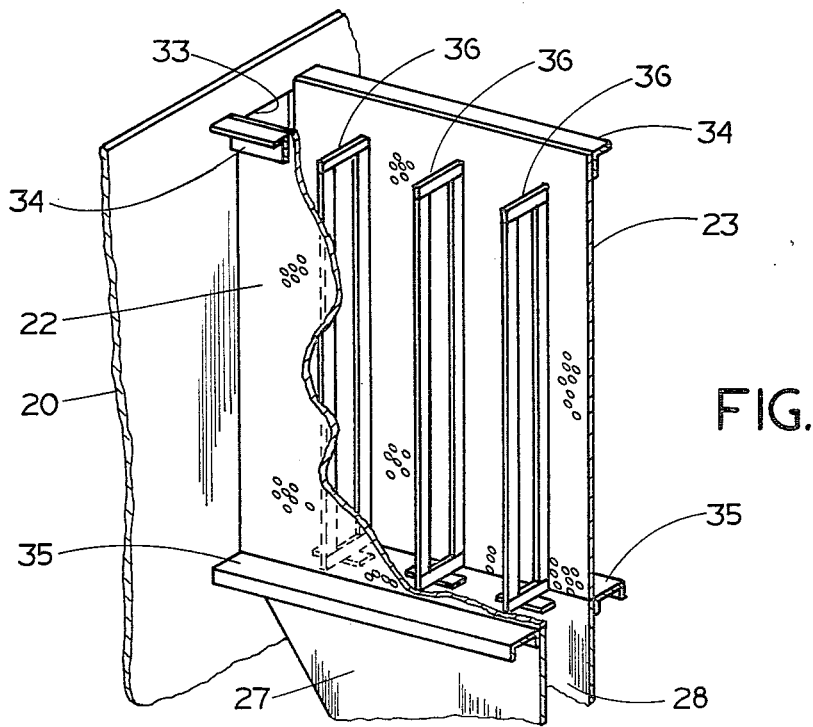
FIG. 5 is an enlarged fragmented isometric view, partially in section, showing the interior of the separating tank.

As shown in FIGS. 2 and 3, a filtering screen 31 having grid openings preferably in the range of 1.5 to 3.0 inches is disposed across each outlet 12 to filter rough debris and foreign matter from the suspension as it flows from the filled continuously flowing reaction tank 9 into the flowpaths 32 of the tapered spillways 13. The flowpaths 32 which extend substantially parallel with the perforate plates 22 and 23, serve to align and direct the entrant flow of the suspension into the separating tanks 19 in a direction substantially parallel with the perforate plates such that upon entering the tanks 19, the flow must make a relatively abrupt 90 degree turn in order to continue into the liquids reservoir. Thus, in addition to accommodating filtration of the suspension through the perforate plates, the invention augments the particulate solids barrier provided by the plates by redirecting the flow within the separating tanks to obtain inertial solids aseparation as well. This feature is further enhanced by the tapered configuration of the spillways 13 which essentially maximize the velocity of the entrant flow at the separating tank inlets 33. Moreover, experience indicates that the parallel entrant flow also effects a scrubbing-like circulation within the separating tanks which abates or reduces clogging of the separated solids in the perforate plates, thereby similarly enhancing the reliability of the scrubbing system.

It should be particularly noted that the type of particulate solids to be removed may be selected by varying the volumetric flow rate of the solids slurry through the bleed line 29. For example, in a gas scrubbing arrangement wherein the total surface area of the perforate plates was approximately ten times the total volumetric or transverse cross-sectional area of the spillways 13 at the separating tank inlets 33 (25 square feet), a bleed discharge flow of 0.5 percent (125 gallons per minute) of the entrant suspension flow into the separating tanks obtained constant separation of scale or reactant precipitates from the flowing suspension, and, when the bleed flow was increased to approximately 5.0 percent (1250 gallons per minute) of the entrant suspension flow, constant stabilized separation of flyash as well as scale was obtained. In the foregoing example, the perforate plates had an open surface area of approximately 50 percent through $\frac{3}{8}$ inch diameter perforations equally spaced about substantially the entire surface of each plate; however, it is to be understood that depending on the nature of the scrubbing system involved (i.e., the composition of the stack gases, the volumetric flow rate of the suspension, the entrant velocity of the suspension flowing into the separating tank, the type of reactant materials injected into the reaction tank, etc.) the size of the perforations can vary, although generally they will be within a range of $\frac{1}{4}$ to $\frac{3}{4}$ of an inch in diameter.

Figure 6:
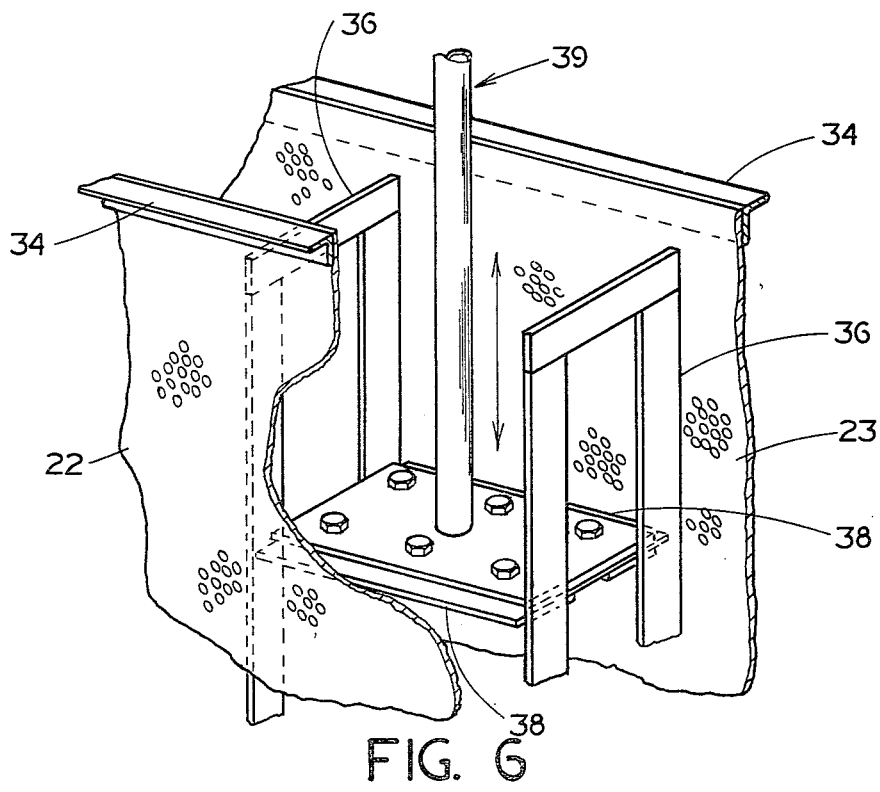
FIG. 6 is an enlarged isometric view similar to FIG. 5 showing the tank scrapper positioned for cleaning the separating tank.

The invention further provides that each separating tank 19 include rigidifying supporting cross-members 34 and 35 connected to the walls 20 and 21 of the liquids reservoir, and a plurality of rectangular reinforcing frames 36 spaced equidistant along the breadth and connecting the opposing perforate plates of the tank. In addition to reinforcing and rigidifying the separating tank structure, the frames 36 also include a guide arrangement for a cleaning scrapper or squeegee 37 provided for scrubbing the interior surfaces of the perforate plates as illustrated in FIG. 6. More particularly, in the event the perforate plates become clogged due to sudden increases in the scaling rate during scrubbing operations, an operator can easily clear the obstruction by simply inserting the squeegee between the frames 36 which guide it downward such that any accummulations of scale or other encrustations are pushed into the hopper 24 and discharged from the tank as discussed above. In this regard, it should be noted that the squeegee is preferably provided with resilient blade members 38 which simultaneously engage the opposing interior surfaces of the tank to effect a uniform scrubbing action, and further, that stops 39 are provided on the frames 36 to limit downward movement of the squeegee.

I claim:

1. A continuous flow liquids-solids separator for separating liquids and solids of a suspension, comprising:
   a liquids reservoir;
   a solids separating tank within the reservoir, said tank being of an essentially rectangular cross-sectional configuration having a pair of generally vertically extending perforate walls providing fluid communication for separated liquids between the interior of the tank and the reservoir, and said perforate walls being disposed in substantially coplanar relation to form opposing walls of the tank;

inlet means for directing entrant flow of the suspension into the tank in a generally horizontal direction substantially parallel with said perforate walls to augment the solids barrier provided by said walls between the interior of the tank and the reservoir;

outlet means for discharge of separated liquids from the reservoir; and bleed discharge means connected with said tank below said inlet means accommodating evacuation of separated solids from the tank concurrent with discharge of separated liquids through said outlet means.

2. The invention according to claim 1, and
said outlet means opening to the reservoir below said separating tank.

3. The invention according to claim 1, and
each of said perforate walls substantially spanning the breadth of said reservoir and being generally vertically coextensive with said inlet means.

4. The invention according to claim 1, and
said bleed discharge means including a pump adapted to withdraw a slurry of separated solids from said tank.

5. The invention acccording to claim 1, and
removable scrapper means insertable between the opposing perforate walls for scrubbing the interior surfaces of said opposing perforated walls.

6. The invention according to claim 5, and
a plurality of reinforcing members connecting said opposing perforate walls, and
said reinforcing members providing guides for said scrapper means.

7. A continuous flow liquids-solids separator for separating liquids and solids of a suspension, comprising:
a liquids reservoir;
a solids separating tank of a generally rectangular horizontal cross-sectional configuration within the reservoir, said tank having a pair of generally vertically extending perforate walls forming spaced opposing walls for the tank providing fluid communication for separated liquids between the interior of the tank and the reservoir;
inlet means for directing entrant flow of the suspension into the tank in a direction substantially parallel with said perforate walls to augment the solids barrier provided by said walls between the interior of the tank and the reservoir;
outlet means for discharge of separated liquids from the reservoir;
bleed discharge means connected with said tank below said inlet means accommodating evacuation of separated solids from the tank concurrent with discharge of separated liquids through said outlet means;
a solids collection hopper enclosing the bottom of said tank;
said hopper including a pair of generally vertical plate portions, each of said plate portions depending from one of said perforate walls and a pair of downwardly converging slope sheets extending between said plate portions; and said bleed discharge means being connected to said hopper.

8. The invention according to claim 7, and
said inlet means including a spillway connected to the separating tank to provide a flowpath for directing the suspension into the tank; and
the volumetric cross-section of said flowpath diminishing along the length of said spillway toward the tank.

9. The invention according to claim 8, and
one of said slope sheets extending from the juncture of the tank and said spillway.

10. In a wet gas scrubbing system adapted to remove sulfur oxides from an industrial stack gas stream, a continuous flow liquids-solids separator for removing particulate solids from gas scrubbing liquids prior to injection of the liquids into the gas stream, comprising:
a liquids reservoir;
a solids separating tank, said tank being of a generally rectangular cross-sectional configuration including a pair of generally vertically extending perforate walls accommodating flow of the scrubbing liquids into the reservoir and effecting a solids barrier between the tank and the reservoir, and said perforate walls being disposed in substantially coplanar relation to form opposing walls of the tank;
inlet means for directing entrant flow of gas scrubbing liquids containing particulate solids into the tank in a generally horizontal direction substantially parallel with said perforate walls to augment said solids barrier;
outlet means for discharge of liquids from the reservoir; and
bleed discharge means connected with said tank below said inlet means accommodating evacuation of separated solids from the tank concurrent with discharge of liquids through said outlet means.

11. The invention according to claim 10, and
said bleed discharge means accommodating a volumetric flow rate selected from the range of substantially 0.5 to 5.0 percent of the volumetric flow rate of the gas scrubbing liquids entering the tank through said inlet means whereby generally only scrubbing liquid precipitates are removed at said 0.5 percent flow rate and both precipitates and flyash are removed at said 5.0 percent flow rate.

12. The invention according to claim 10, and
the perforations in said perforate wall being of diameters in the range of ¼ to ¾ of an inch.

13. The invention according to claim 12, and
screening means disposed across said inlet means to filter the suspension as it is directed into the tank; and
said screening means having grid openings of diameters in the range of 1.0 to 3.0 inches.

* * * * *